Figure 1:
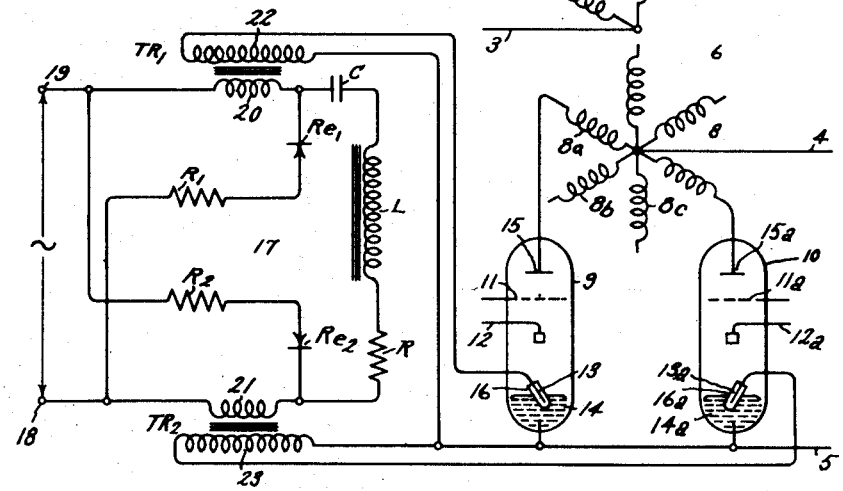

Jan. 4, 1955   H. W. LORD   2,698,908
CIRCUIT FOR PRODUCING PEAKED VOLTAGE WAVES
Filed June 25, 1952

REACTOR HYSTERESIS LOOP.

TRANSFORMER HYSTERESIS LOOP.

Inventor:
Harold W. Lord,
by Orowell S. Mack
His Attorney.

United States Patent Office 2,698,908
Patented Jan. 4, 1955

2,698,908

CIRCUIT FOR PRODUCING PEAKED VOLTAGE WAVES

Harold W. Lord, Schenectady, N. Y., assignor to General Electric Company, a corporation of New York Application June 25, 1952, Serial No. 295,430

15 Claims. (Cl. 307—107)

This invention relates to circuits for producing peaked voltage waves and, more particularly, to a tubeless arrangement which produces such voltages having a high order of magnitude and which is adaptable for use in controlling vapor electric discharge devices of the type employing a pool type cathode.

In one form of pool cathode electric discharge device, a starter electrode is employed in which the starter is continuously immersed in the pool cathode and through which a predetermined minimum current is passed to form a cathode spot and initiate the discharge. Such a starting electrode, while of relatively high resistance compared with a metallic conductor, is of relatively low resistance as compared with a dielectric.

Another type of starter electrode for use in conjunction with vapor electric discharge devices is of the so-called dielectric type in which the starting electrode includes a conductor surrounded by an insulator or dielectric material such as glass or a ceramic. Such ceramic type starters require a high starting voltage. The high voltage required imposes a severe duty voltagewise on the apparatus used to energize ceramic type starter electrodes.

One object of this invention is to provide an improved circuit for energizing a ceramic type ignitor which is characterized by improved reliability and longer life than is possible with presently known energizing circuits.

Still another object of the invention is to provide an improved voltage transformation circuit made up of static parts which inherently are capable of reliable performance under high voltage conditions.

The invention in one form as applied to a pair of gaseous discharge devices connected to operate as a single phase full wave converter utilizes a reactor connected in series with the primary windings of two transformers. The reactor is arranged to saturate before the core of one of the transformers saturates during half cycles of one polarity and the reactor also saturates before the other transformer core during half cycles of opposite polarity so that saturation of the reactor in effect acts as a synchronous switch so as to allow sudden inrushes of current through the series circuit during each half cycle. In order to cause the secondary winding of each transformer to be supplied with a relatively high voltage during alternate half cycles, means including unidirectional conducting devices are provided for each transformer and are connected so as to presaturate the transformers during alternate half cycles so that the flow of current through the non-linear reactor and the transformers produces a high voltage in one transformer during one half-cycle and in the other transformer during the succeeding half cycle.

Figure 2:
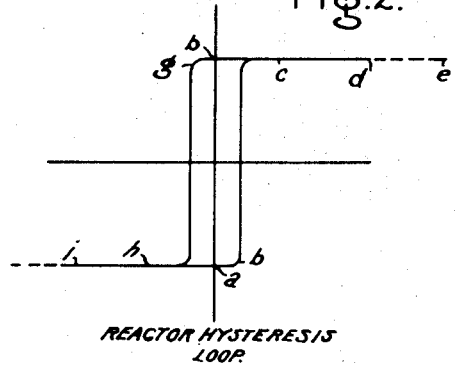
Figure 3:
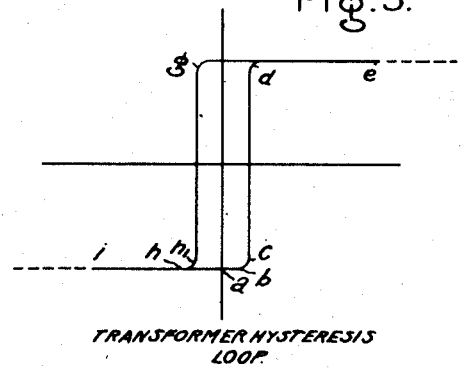
Figure 4:
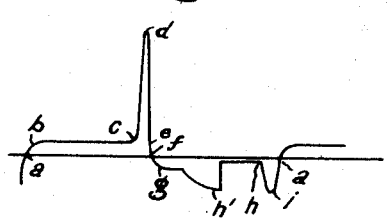
Figure 5:
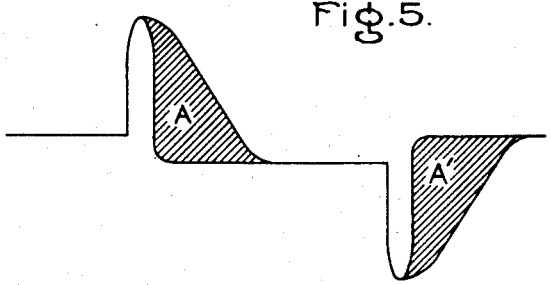

The invention will be better understood from the following description taken in conjunction with the drawings in which Fig. 1 is a schematic representation of a starter electrode energizing circuit embodying the principles of the invention; Figs. 2 and 3 represent respectively the hysteresis loop of a non-linear reactor core and the hysteresis loop of a transformer core which comprise essential parts of the invention; and in which Figs. 4 and 5 are voltage and current curves respectively to aid in understanding the principles of the invention.

With reference to Fig. 1 a polyphase circuit is represented by the conductors 1, 2 and 3. A direct current circuit is represented by the conductors 4 and 5. Interposed between the polyphase and direct current circuits is an electronic translating circuit including a three phase transformer 6 having a delta connected winding 7 and a star connected winding 8 comprising three phase windings having their midpoints connected together. The end terminals of one phase, 8a of winding 8, are connected respectively to the anodes 15 and 15a of a pair of ignitron type valves 9 and 10. The cathodes 14 and 14a of valves 9 and 10 are connected with the direct current conductor 4 is connected to the common midpoint of the secondary winding 8. It will be understood that the tubes 9 and 10 are arranged to operate as a full wave converter and that a pair of tubes, such as 9 and 10, would be respectively connected between the end terminals of the two remaining phase windings 8b and 8c of the secondary winding 8 of transformer 6 and the direct current conductor 5. For the sake of simplicity, these two additional pairs of valves have been omitted from the drawing.

Valve 9 is provided with a control grid 11, an auxiliary or holding anode 12, and a ceramic type starter electrode or ignitor 13 which is immersed in a mercury pool cathode 14. The corresponding elements of valve 10 are designated by the same numerals with the suffix "a" added to each numeral. Suitable circuits (not shown) would be provided for energizing control grids 11 and 11a and auxiliary or holding anodes 12 and 12a. Such circuits could be of the type disclosed in Patent 2,544,345, granted March 6, 1951, on an application by A. H. Mittag and assigned to the assignee of this invention. Since these circuits form no part of the present invention, they have been omitted from the drawing for the sake of simplicity. It will be understood that the arrangement described thus far could function as a rectifier or as an inverter depending on the particular adjustment of the signals supplied to the control elements of the valves 9 and 10.

Each of the starter electrodes 13 and 13a comprises a conductor element respectively surrounded by a member 16 and 16a of glass or ceramic material. In order to establish a cathode spot on the cathodes 14 and 14a, a relatively high voltage of steep wave front must be supplied between the conductor elements of the electrodes and the associated mercury pool.

For the purpose of supplying a high voltage signal to the starter electrodes 13 and 13a, the firing circuit generally designated by the numeral 17 is provided in accordance with the invention. The circuit 17 includes the terminals 18 and 19 which are energized from a suitable source of alternating current voltage. Connected to the terminals 18 and 19 is a series circuit comprising the primary 20 of a transformer $TR_1$, a capacitor C, the winding of a non-linear reactor L, a resistor R and the primary winding 21 of a transformer $TR_2$. The transformers $TR_1$ and $TR_2$ are provided with secondary windings respectively designated by the numerals 22 and 23, which windings are respectively connected to the conductor element of electrode 13 and the mercury pool 14 and to the conductor element of electrode 13a and the mercury pool 14a to supply energizing voltages to the respective electrodes.

In accordance with one feature of the invention, the non-linear reactor L and transformers $TR_1$ and $TR_2$ are provided with core material having a rectangular shaped hysteresis loop and the non-linear reactor L is arranged to saturate at instantaneous values of current which are smaller than the current required to saturate the transformers $TR_1$ and $TR_2$. Furthermore, since the current which flows through the series circuit comprising the windings 20 and 21 and the reactor L before saturation of reactor L is too small to effect a substantial change in flux of the transformers $TR_1$ and $TR_2$, there will be very little voltage output from either of these transformers during that portion of the alternating voltage wave which occurs prior to saturation of reactor L. However, once the reactor L saturates a substantial magnitude of current will suddenly flow through the series circuit comprising windings 20 and 21 and the non-linear reactor L. Such a sudden flow of current causes a sudden change in the transformer flux and hence tends to produce a substantial voltage output such as would be sufficient to energize operably the ceramic ignitors 13 and 13a.

It will be understood that the reactor L could be made to saturate before the transformers by providing the reactor with more turns per unit length of core than are provided for the primary of each transformer, the reactor and transformers having cores of identical magnetic characteristics. Likewise, the reactor could be made to saturate before the transformers by proper choice of different magnetic materials, the turns per unit core length of the reactor being equal to or even less than the turns per unit core length of the transformers.

Preferably the magnetic material for the reactor and the transformers should have a rectangular hysterisis loop magnetic characteristic. For example, in the reactor such material affords very high inductance when operating in an unsaturated condition and a very low inductance when saturated. In this way, the reactance is made more closely to approximate the action of a synchronous switch than other material not having a rectangular hysteresis loop. With respect to the transformers, such rectangular magnetic hysteresis loop core materials provide the greatest total flux change between the residual flux density at one polarity and saturation at the opposite polarity. Furthermore, when saturated, the flux density change is very small which is advantageous as will be pointed out.

Since it is desired to operate the valves 9 and 10 during alternate half cycles so as to cause the tubes 9 and 10 to operate as a full wave device, means are provided to prevent a large voltage from being supplied to one of the ignitors 13 and 13a during the half cycle when a large magnitude of voltage is supplied to the other of the ignitors. To this end, a unidirectional conducting device $Re_1$, a resistor $R_1$, and the winding 20 are connected in a series circuit between the terminals 19 and 20 and a unidirectional conducting device $Re_2$, a resistor $R_2$, and winding 21 are connected in a series circuit between the terminals 19 and 20.

Thus, assuming that the terminal 19 is positive, a presaturating current will flow from this terminal through the resistor $R_2$, through the rectifier $Re_2$, and through the transformer winding 21 to the terminal 18 during an initial portion of the positive half cycle of voltage. Such a flow of current is at a relatively slow rate so as to cause but a relatively small rate of flux change in the transformer $TR_2$ and thus produces a relatively low voltage across the secondary winding 23 thereof. Subsequently in the half cycle, while terminal 19 is positive, non-linear reactor L saturates and a large current flows through windings 20 and 21, non-linear reactor L. capacitor C, and resistor R. Since the transformer $TR_2$ has already been saturated by current supplied through resistor $R_2$ and rectifier $Re_2$, saturation of reactor L does not produce a large voltage output in the winding 23 of transformer $TR_2$ but does produce a large pulse of voltage from transformer $TR_1$ as will be explained later.

During the subsequent half cycle when the terminal 18 is positive, current is supplied through resistor $R_1$, rectifier $Re_1$, and the winding 20 to the terminal 19. The effect of this current flowing through winding 20 is to magnetize transformer $TR_1$ at the same polarity as that at which the transformer is magnetized due to current flowing through reactor L during this half-cycle and the two transformer windings 20 and 21 and devices R and C from terminal 18 to terminal 19. Thus saturation of reactor L does not produce a substantial output of voltage in the winding 22 of transformer $TR_1$. Such a flow of current, however, tends to magnetize the transformer $TR_2$ with opposite polarity from that of the previous half cycle so that a substantial change in flux is produced in the transformer $TR_2$ when the reactor L saturates during this subsequent half cycle. In this way, a substantial voltage is supplied from the secondary winding 23 of the transformer to the electrode 13a of the valve 10.

When the terminal 19 again becomes positive during the succeeding half cycle, a substantial voltage output from winding 22 is supplied to starter 13 of valve 9 due to the fact that the transformer $TR_1$ has previously been magnetized with a polarity which is different from that which is due to the flow of current when terminal 19 is positive. Thus during alternate half cycles of voltage supplied to terminals 18 and 19, signals are supplied respectively to the starter electrodes 13 and 13a.

As will be understood by those skilled in the art, suitable values of resistor R would be chosen so as to obtain the desired operation from the available voltage across terminals 18 and 19 with the desired components for the transformers and non-linear reactor being determined by the requirements of the particular ceramic ignitors which are to be energized. In some cases this may be only the resistance of the several coil windings. A suitable value for capacitor C would likewise be chosen so that the cross hatched portions A and A' of the current wave shown in Fig. 5 would be effectively eliminated as is understood by those skilled in the art thereby improving the efficiency of the circuit by reducing the R. M. S. value of current without appreciably reducing the peak value of the current. The capacitor C, while helpful for most applications of the invention, is not deemed to be an essential component of the circuit, suitable operation being obtainable without the use of capacitor C for certain applications of the invention. However, capacitor C improves the efficiency of the circuit by reducing the amplitude of supply frequency component of current drawn by the circuit.

The particular cooperation between the non-linear reactor L and one of the transformers such as $TR_1$ for a half cycle of one polarity is illustrated by Figs. 2–4. It will be understood that transformer $TR_2$ operates in an identical manner during half cycles of opposite polarity. As is indicated on the drawing, Fig. 2 represents the hysteresis loop for the core material of reactor L while Fig. 3 represents the hysteresis loop for the core material at one transformer such as $TR_1$. The small letters a–i represent corresponding instants of time during a positive half cycle of magnetizing current of sufficient magnitude to saturate the core of the transformer. Thus at the time indicated at "a," the flux in both the reactor and in the transformer is of one polarity and of such a value as to saturate the cores thereof and the magnetizing current is at a zero value. Subsequently, the magnetizing current is increased to the value at time "b" and thereafter to the value at time "c." It will be observed from Fig. 2 that the change in flux in the reactor from time "b" to time "c" is a substantial value whereas the change in flux in the transformer is very minor during this period. Subsequently, the transformer flux is changed substantially between time "c" and time "d." The flux in the reactor between the time "c" and the time "d" does not change appreciably in view of the rectangular characteristic of the magnetic material. From the description thus far it will be understood that the reactor L in effect acts as a synchronous switch during each half cycle to cause a peak of voltage to be supplied to the ignitors 13 such as is represented in Fig. 4. In Fig. 4, it will be observed that between the time "b" and the time "c," a relatively low voltage is supplied by the transformer. Between times "c" and "e," a substantial voltage output from the transformer occurs followed immediately by a reversal in polarity of the voltage. During the time when the reactor flux changes from the value indicated at "g" to the value indicated at "h" as shown in Fig. 2, the rectifier $Re_1$ and resistor $R_1$ supply just enough additional current to the transformer winding 20 to cause the transformer flux to slowly change from "g" to "h" thereby inducing the relatively low secondary voltage shown in Fig. 4 between the times indicated at "g" and "h." When reactor L saturates at time "h" as shown in Fig. 2 the pulse of current supplied through the circuit due to saturation of reactor L induces only a small voltage in the transformer secondary as shown at "i" in Fig. 4 since the transformer core is already saturated in this direction and the available flux change is very small. Thus it will be understood that between the times "a" and "b" the reactor L effectively maintains the current through the circuit at a relatively low value. Thereafter upon saturation of the non-linear reactor L during half cycles of one polarity, a substantial peak voltage is supplied to the appropriate transformer and during half cycles of the opposite polarity, only small voltage peaks are induced in the secondary of such transformer.

While I have described and illustrated a particular embodiment of the invention, I do not wish to be limited thereto and intend in the appended claims to cover all such changes and modifications as fall within the true spirit and scope of the invention.

What I claim as new and desire to secure by Letters Patent of the United States is:

1. A circuit for producing voltage pulses from half cycles of an alternating input voltage comprising first and second inductive reactors each having a winding, means for connecting said windings in series across an input alternating voltage source to provide a circuit current therethrough, said first reactor having a saturable core dimensioned to saturate abruptly during a portion of an input half-cycle at a circuit current value less than that required for a substantial change of flux in said second reactor whereby the circuit current and the flux in said second reactor sharply changes, and means responsive to the circuit flux change in said second reactor for performing a predetermined operation.

2. A circuit for producing voltage pulses from half cycles of an alternating input voltage comprising a reactor having a saturable core with a winding thereon, a transformer having primary and secondary windings, means for connecting said reactor winding and said primary winding in series across an input alternating voltage source to provide a circuit current therethrough, said core of said first reactor being dimensioned to abruptly saturate during a portion of an input half-cycle at a circuit current value less than that required for a substantial change of flux in said transformer whereby the circuit current and the transformer flux sharply increases, and means for coupling said secondary winding to a load for providing voltage pulses thereto.

3. In combination, a circuit including a non-linear reactor having a winding connected in series with a winding of another non-linear device having a saturable core, said reactor and said winding being respectively provided with cores of magnetic material characterized by substantially rectangular hysteresis loops, and means for supplying an alternating voltage to said circuit sufficient to saturate said reactor, said reactor and said device being so constructed that the current drawn by said circuit during the portion of a half cycle when the reactor is unsaturated is less than the current required to effect a substantial change in flux in the core of said device and so that the current drawn by the circuit after saturation of said reactor is sufficient to effect a substantial change in the flux in said device, means for magnetizing the core of said device at one polarity prior to saturation of said reactor, said one polarity being opposite to the polarity of said device after said substantial change in flux thereof is effected, and means responsive to a substantial change in the flux in said device for performing a predetermined operation.

4. In combination, a circuit including a non-linear reactor having a winding connected in series with a winding of another non-linear device having a saturable core, said circuit being energized from an alternating voltage source adequate to saturate said reactor, a unidirectional conducting device connected to supply a current pulse through said non-linear device during half cycles of one polarity so as to magnetize the core of said non-linear device at one polarity prior to saturation of said reactor, the flow of current through said reactor and said non-linear device immediately after saturation of said reactor being in such a direction as to tend to magnetize said non-linear device to said one polarity, and the current through said reactor and said non-linear device during the immediately succeeding half cycle being in the opposite direction so as to tend to reverse the flux in the core of said non-linear device.

5. In combination, a circuit including a non-linear reactor having a winding connected in series with a winding of another non-linear device having a saturable core, said circuit being energized from an alternating voltage source sufficient to saturate said reactor, said reactor and said device being so constructed that said reactor saturates before said device, a unidirectional conducting device connected to supply a current pulse through said non-linear device during half cycles of one polarity so as to magnetize the core of said non-linear device at one polarity prior to saturation of said reactor, the flow of current through said reactor and said non-linear device immediately after saturation of said reactor being in such a direction as to tend to magnetize said non-linear device to said one polarity, and the current through said reactor and said non-linear device during the immediately succeeding half cycle being in the opposite direction so as to tend to reverse the flux in the core of said non-linear device.

6. In combination, a circuit including a non-linear reactor having a winding connected in series with a winding of another non-linear device having a saturable core, said circuit being energized from an alternating voltage source sufficient to saturate said reactor, a unidirectional conducting device connected to supply a current pulse through said non-linear device during half cycles of one polarity so as to magnetize the core of said non-linear device at one polarity prior to saturation of said reactor, the current through said reactor and said non-linear device during half cycles of opposite polarity being effective to reverse the flux in the core of said non-linear device, and means responsive to a reversal of flux in said non-linear device for performing a control operation.

7. In combination, a circuit including a non-linear reactor having a winding connected in series with a winding of another non-linear device having a saturable core, said reactor and said device each having cores of similar magnetic material having a rectangular hysteresis loop and said circuit being energized from an alternating voltage source sufficient to saturate said reactor, the number of turns per unit length of said reactor being greater than for said device, a unidirectional conducting device connected to supply a current pulse through said non-linear device during half cycles of one polarity so as to magnetize the core of said non-linear device at one polarity prior to saturation of said reactor, the flow of current through said reactor and said non-linear device immediately after saturation of said reactor being in such a direction as to tend to magnetize said non-linear device to said one polarity, and the current through said reactor and said non-linear device during the immediately succeeding half cycle being in the opposite direction so as to tend to reverse the flux in the core of said non-linear device.

8. In combination, a circuit including a non-linear reactor having a winding connected in series with a winding of another non-linear device having a saturable core, said reactor and said device each having cores of substantially identical magnetic material having a rectangular hysteresis loop and said circuit being energized from an alternating current source sufficient to saturate said reactor, the number of turns per unit length of the core of said reactor being greater than for said device, a unidirectional conducting device connected to supply a current pulse through said non-linear device during half cycles of one polarity so as to magnetize the core of said non-linear device at one polarity prior to saturation of said reactor, the current through said reactor and said non-linear device during half cycles of opposite polarity being effective to reverse the flux in the core of said non-linear device, and means responsive to a reversal of flux in said non-linear device for performing a control operation.

9. In combination, a transformer having a primary and a secondary winding and a core of non-linear magnetic material, a non-linear reactor with a core of similar material having a winding connected in series with said primary winding, and means for supplying an alternating voltage to the series-connected windings sufficient to saturate said reactor, the number of turns per unit length of the magnetic circuit of said reactor being greater than the number of turns per unit length of the magnetic circuit of said transformer so that the current drawn by said reactor and said primary winding during the portion of a half cycle when the reactor is unsaturated is less than the current required to effect a substantial change in flux in said transformer, the current drawn by said reactor and said primary winding being sufficient to effect a substantial change in flux in said transformer after saturation of said reactor, and means energized by said secondary winding and responsive to a substantial change in the flux in said transformer due to saturation of said reactor for performing a predetermined operation.

10. In combination, a transformer having a primary and a secondary winding and a core of non-linear magnetic material, a non-linear reactor having a core of similar non-linear material and having a winding connected in series with said primary winding, and means for supplying an alternating voltage to the series-connected windings sufficient to saturate said reactor, the number of turns per unit length of the magnetic circuit of said reactor being greater than the number of turns per unit length of the magnetic circuit of said transformer so that the current drawn by said reactor and said primary winding during the portion of a half cycle when the reactor is unsaturated is less than the current required to effect a substantial change in flux in said transformer, the current drawn by said reactor and said primary winding being sufficient to effect a substantial change in flux in said transformer after saturation of said reactor, means for supplying a current impulse to said primary winding during predetermined alternate half cycles of said alternating voltage and before saturation of said reactor for magnetizing said transformer with the polarity at which said transformer is magnetized by the current drawn after saturation of said reactor so as to prevent such current from effecting a rapid change in the flux of said transformer during said predetermined alternate half cycles, and means energized by said secondary winding and responsive to a substantial change in the flux in said transformer due to saturation of said reactor for performing a predetermined operation during half cycles of opposite polarity from said predetermined alternate half cycles.

11. In combination, a circuit including a non-linear reactor having a winding connected in series with a winding of another non-linear device having a saturable core, said circuit being energized from an alternating current source sufficient to saturate said reactor, a unidirectional conducting device connected to supply a current pulse through said non-linear device during half cycles of one polarity so as to magnetize the core of said non-linear device at one polarity prior to saturation of said reactor, the flow of current through said reactor and said non-linear device immediately after saturation of said reactor being in such a direction as to tend to magnetize said non-linear device to said one polarity, and the current through said reactor and said non-linear device during the immediately succeeding half cycle being in the opposite direction so as to tend to reverse the flux in the core of said non-linear device, the rate of flow of current through said reactor and said non-linear device after saturation of said reactor being substantially different from the rate of flow of a current pulse through said unidirectional conducting device and said non-linear device.

12. In combination, a circuit including a non-linear reactor having a winding connected in series with a winding of another non-linear device having a saturable core, said circuit being energized from an alternating current source sufficient to saturate said reactor, a unidirectional conducting device connected to supply a current pulse through said non-linear device during half cycles of one polarity so as to magnetize the core of said non-linear device at one polarity prior to saturation of said reactor, the flow of current through said reactor and said non-linear device immediately after saturation of said reactor being in such a direction as to tend to magnetize said non-linear device to said one polarity, and the current through said reactor and said non-linear device during the immediately succeeding half cycle being in the opposite direction so as to tend to reverse the flux in the core of said non-linear device, the rate of flow of current through said reactor and said non-linear device after saturation of said reactor being substantially greater than the rate of flow of a current pulse through said unidirectional conducting device and said non-linear device.

13. A circuit for producing voltage pulses from half cycles of an alternating input voltage comprising first and second inductors each comprising a saturable core with a winding thereon, means for connecting said windings in series across an input alternating voltage source to provide a circuit current therethrough, a unidirectional conducting device, means for connecting said device in series with said second reactor winding across said source to provide current during alternate half cycles therethrough and magnetize the core of said second reactor at one polarity, the core of said first reactor being dimensioned to saturate abruptly during a portion of an input half-cycle of the opposite polarity at a circuit current value less than that required for a substantial change of flux in said second reactor whereby the circuit current sharply increases and the flux of said second reactor is reversed, and output means responsive to flux reversal in said second reactor.

14. A circuit for producing a voltage pulse from each half cycle of an input alternating voltage comprising a saturable triggering reactor and first and second saturable output reactor devices, each having a reactance winding, said windings being connected in series circuit, means for connecting said circuit across an alternating voltage input source to provide a circuit current for saturating said reactor, a first unidirectional conducting device connected in series with said first reactor device across said source to provide a saturating current corresponding to alternate half cycles of one polarity through said first reactor, a second unidirectional conducting device connected in series with said second reactor device to provide a saturating current corresponding to the alternate half cycles of the opposite polarity through said second reactor, said triggering reactor being dimensioned to saturate abruptly during a portion of each circuit current half cycle whereby the circuit current increases to reverse the flux in said first and second reactor devices during alternate half cycles, and output means responsive to flux reversal in said first and second devices.

15. A circuit for producing a voltage pulse from each half cycle of an input alternating voltage comprising a saturable triggering reactor, first and second saturable transformers each having an input winding, first and second terminals for an alternating voltage input source, means for connecting said windings in series circuit with the primary windings of said first and second transformers respectively connected to said first and second terminals to provide a circuit current for saturating said reactor, a first unidirectional conducting device connected in a shunting series circuit between said winding of said first transformer and said second terminal to provide a saturating current corresponding to alternate half cycles of one polarity through said first transformer, a second unidirectional conducting device connected in a shunting series circuit between said winding of said second transformer and said first terminal to provide a saturating current corresponding to the alternate half cycles of the opposite polarity through said second transformer, said triggering reactor being dimensioned to saturate abruptly during a portion of each circuit current half cycle whereby the circuit current increases to reverse the flux in said first and second transformers during alternate half cycles, and output windings responsive to said transformer flux reversals for performing a predetermined operation.

No references cited.